R. B. FORD.
POULTRY FOUNTAIN.
APPLICATION FILED FEB. 3, 1912.
1,065,439.
Patented June 24, 1913.
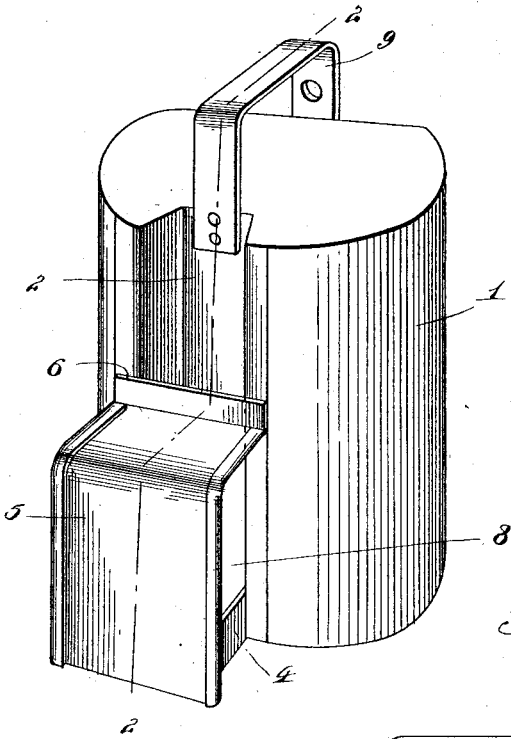
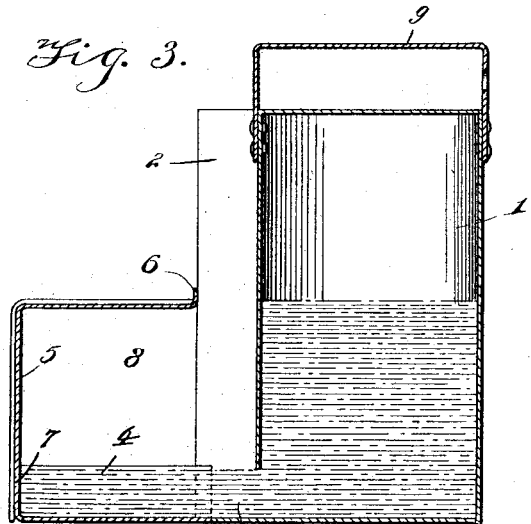
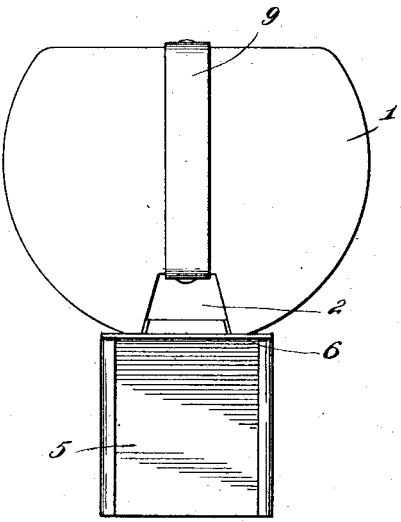
Inventor
Robert B. Ford.
Witnesses
By Victor J. Evans
Attorney

UNITED STATES PATENT OFFICE.

ROBERT B. FORD, OF HOMESTEAD, PENNSYLVANIA.

POULTRY-FOUNTAIN.

1,065,439. Specification of Letters Patent. Patented June 24, 1913.

Application filed February 3, 1912. Serial No. 675,176.

*To all whom it may concern:*

Be it known that I, ROBERT B. FORD, a citizen of the United States of America, residing at Homestead, in the county of Allegheny and State of Pennsylvania, have invented new and useful Improvements in Poultry-Fountains, of which the following is a specification.

The invention relates to improvements in fountains and has particular application to a poultry drinking fountain.

In carrying out the present invention, it is my purpose to provide a fountain of this character wherein the water or other drinking liquid may be fed automatically from a reservoir to a trough, the flow from the reservoir being controlled by the level of the liquid within the trough.

Furthermore, I aim to provide a fountain of this type which shall be constructed in such a manner as to render the same cleanly and sanitary and which shall be cheap to manufacture, simple in construction and efficient and positive in operation.

The invention has for a still further object the provision of a fountain of this class which shall include a reservoir formed of a single sheet of metal and stamped to provide a liquid inflow groove having communication with the reservoir through an opening in one wall of the latter at the bottom thereof, the trough being connected to the reservoir in proximity to the groove therein and in open communication therewith through the medium of the opening in the wall thereof, and a guard connected to the reservoir and partially inclosing said trough so as to prevent the ingress of dirt and other foreign matter to the trough from the front and top thereof.

With the above objects in view and others of a similar nature, the invention consists in the construction, combination and arrangement of parts hereinafter set forth in and falling within the scope of the appended claim.

In the drawing forming a part of this specification; Figure 1 is a detail perspective view of a poultry fountain constructed in accordance with the present invention. Fig. 2 is a central vertical sectional view of the same on the line 2—2 of Fig. 1, and Fig. 3 is a top plan view thereof.

Similar reference characters designate like parts throughout the several views.

Referring to the accompanying drawing in detail, the improved poultry fountain as shown includes a reservoir 1 formed from a single sheet of metal and stamped to provide a vertical inflow groove 2 formed in one wall thereof. This reservoir 1 is capable of containing a quantity of drinking liquid such as water and at its bottom is provided with an opening 3 contiguous to the groove 2 therein.

Connected to the side walls of the groove 2 and in communication with the reservoir 1 is a trough 4 formed of sheet metal and of substantially rectangular contour, communication between the trough and reservoir being had through the medium of the opening 3, the walls of the trough extending slightly above the said opening so that the trough may be supplied with water from the reservoir 1 upon the level of the water within said trough reaching a point below the opening 3 of the reservoir thereby permitting air to flow into the reservoir to facilitate the discharge of water therefrom and into the trough, it of course being understood that the reservoir is air tight, for this purpose, when the water level in the trough has reached a height above the wall of the opening 3, thus sealing the said opening against the flow of water from the reservoir.

In order to protect the trough and reservoir from dirt and other foreign matter and to enable a plurality of fowls to drink simultaneously from the trough 1, I have provided a guard 5 stamped from a single sheet of metal and connected to the reservoir 1 as at 6 at a suitable distance above the trough 4, through the medium of solder or the like. The guard 5 as shown is of a curved outline and has its lower or free terminal soldered or otherwise fastened to the front walls of the reservoir 4, as at 7. This guard as shown is of a width greater than the similar dimensions of the groove 2 and the trough 4 and owing to its curvature it will be noted that the ingress of foreign matter to the trough from the front and top thereof is eliminated. The guard in conjunction with the front wall of the reservoir 1 forms lateral drinking openings 8 designed to permit access to the trough from the sides thereof, thereby allowing a plurality of fowls to obtain access to the trough simultaneously at the opposite side thereof and without interfering with one another.

In order to fill the reservoir, when the same has been emptied of its contents, the latter is turned upon its back wall and the water or other drinking liquid poured into the inflow groove 2, thus permitting filling of the reservoir 1 through the medium of the opening 3 thereof, the water flowing down the inflow groove to such opening, thence into the reservoir.

A handle 9 is riveted or otherwise fastened to the reservoir at the top thereof to facilitate the conveying of the fountain from one point to another.

From this construction it will be seen that the fountain may be placed intermediate a plurality of poultry pens without raising antagonism between the fowls.

What I claim is:

A poultry fountain comprising a reservoir formed of a single sheet of metal having the front wall thereof stamped to provide a vertical inflow groove coextensive with the height of the reservoir and having an opening adjacent to the bottom contiguous the groove, a trough connected with said reservoir in proximity to the groove therein and in open communication therewith through the said opening, and a guard connected to the front of the reservoir and to the front of the trough and partially inclosing the latter and forming with the adjacent wall of the reservoir a lateral opening.

In testimony whereof I affix my signature in presence of two witnesses.

ROBERT B. FORD.

Witnesses:
E. K. COLCLASER,
SYLVESTER FOX.

Copies of this patent may be obtained for five cents each, by addressing the "Commissioner of Patents, Washington, D. C."